United States Patent [19]

Nilsson et al.

[11] 3,955,652
[45] May 11, 1976

[54] OPERATING SYSTEMS FOR TRAILER BRAKES

[75] Inventors: Sture Nils Nilsson, Jakobsberg; Rune Sven Nilsson; Ingmar Karl Linus Andren, both of Lindesberg, all of Sweden

[73] Assignee: AB Linde International, Lindesberg, Sweden

[22] Filed: Dec. 30, 1974

[21] Appl. No.: 537,427

Related U.S. Application Data

[63] Continuation of Ser. No. 451,699, March 15, 1974, abandoned, which is a continuation of Ser. No. 252,867, May 12, 1972, abandoned, which is a continuation of Ser. No. 38,241, May 18, 1970, abandoned.

[30] Foreign Application Priority Data

May 23, 1969 Sweden .............................. 7322/69

[52] U.S. Cl. .............................. 188/112; 180/82 R; 280/432; 303/7; 303/20
[51] Int. Cl.² .......................................... B60T 7/20

[58] Field of Search .................. 303/7, 20; 188/112, 188/3; 180/82; 280/432, 446

[56] References Cited

UNITED STATES PATENTS

| 2,856,036 | 10/1958 | Mullen | 188/112 |
|---|---|---|---|
| 2,916,107 | 12/1959 | Huentelman | 188/112 |
| 3,053,348 | 9/1962 | Stair | 188/112 |

FOREIGN PATENTS OR APPLICATIONS

| 439,728 | 1/1927 | Germany | 188/112 |

*Primary Examiner*—Trygve M. Blix
*Assistant Examiner*—Douglas C. Butler
*Attorney, Agent, or Firm*—Karl W. Flocks

[57] ABSTRACT

An operating system for trailer brakes, where the pull and pressure on the coupling unit between the tractor and trailer vehicles are utilized to control the braking power of the trailer by sensing the pull and pressure on the coupling unit and regulating the supply of braking power via an amplifier.

7 Claims, 3 Drawing Figures

OPERATING SYSTEMS FOR TRAILER BRAKES

This application is a continuation of application Ser. No. 451,699 filed Mar. 15, 1974 which is a continuation of application Ser. No. 252,867 filed May 12, 1972 which is a continuation of application Ser. No 38,241 filed May 18, 1970 all of which are now abandoned.

The present invention relates to an operating system for trailer brakes adapted to regulate the effect of the brakes of the trailer vehicle in dependence on changes in load occurring on the coupling unit between the tractor and trailer vehicles as a result of differences in relative speed between said vehicles.

For the operation of trailer brakes one has hithertofore used, on one hand, override brakes, i.e. brakes which are actuated by the trailer pushing against the tractor vehicle when the speed of the latter decreases and, on the other hand, hydraulic, pneumatic or electric brakes which are operated from the tractor vehicle. However, conventional braking systems involve considerable drawbacks and the three last-mentioned types of brakes often necessitate far-reaching alterations of the braking system of the tractor vehicle. Override brakes of known design require a certain movability of the draw bar and in order not to provoke braking at jerks between the tractor and trailer vehicles such brakes must possess a comparatively great inertia. Despite its drawbacks, the override brake affords the advantage of not requiring any considerable alteration of the tractor vehicle.

The object of this invention is to provide an operating system for trailer vehicles which, like the known type of override brakes, requires no alteration of the braking system of the tractor vehicle but, unlike such known override brakes, permits perfectly controlled braking without any risk of negatively affecting the road holding properties of the tractor-trailer unit.

Another object of this invention is to provide an operating system which permits simultaneous braking of both the tractor and trailer vehicles without any delays and permits reversing of the unit without any of those special measures which are required for conventional trailers provided with override brakes.

The essential characteristic of the operating system of this invention is that a transmitter sensing pressure and pull on the coupling unit is adapted to control an amplifier or like means which is responsive to the magnitude and direction of the pressure and pull to control the supply of power from a suitable source to the brakes, and that the transmitter is adapted to be actuated even by very small changes in the relative positions of two components of a substantially rigid coupling unit.

An embodiment, chosen by way of example, of the operating system of the present invention will now be described in more detail with reference to the accompanying drawings in which:

FIG. 1 schematically illustrates how the operating system is mounted in a trailer provided with electric braking means;

Figure 1:
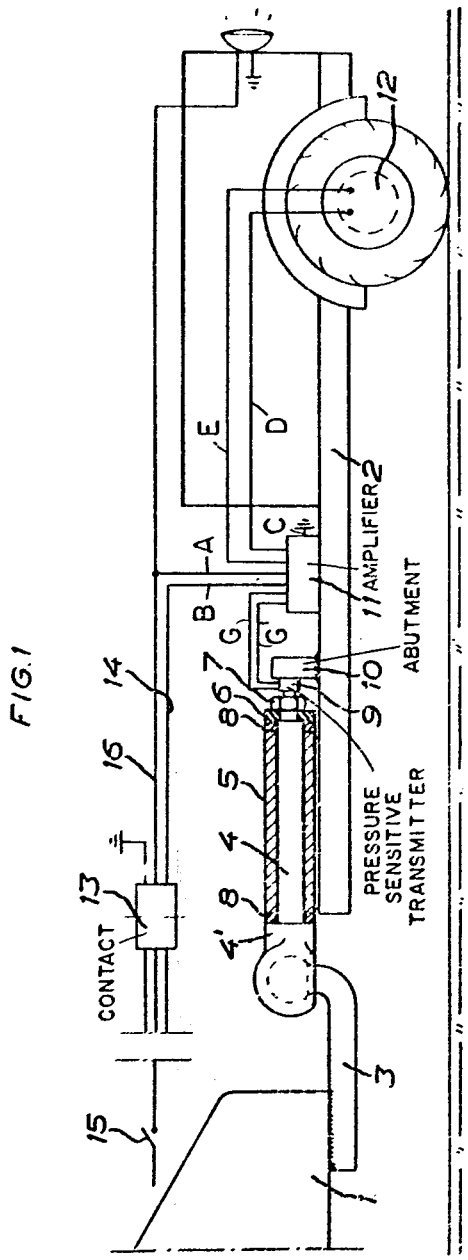
Figure 2:
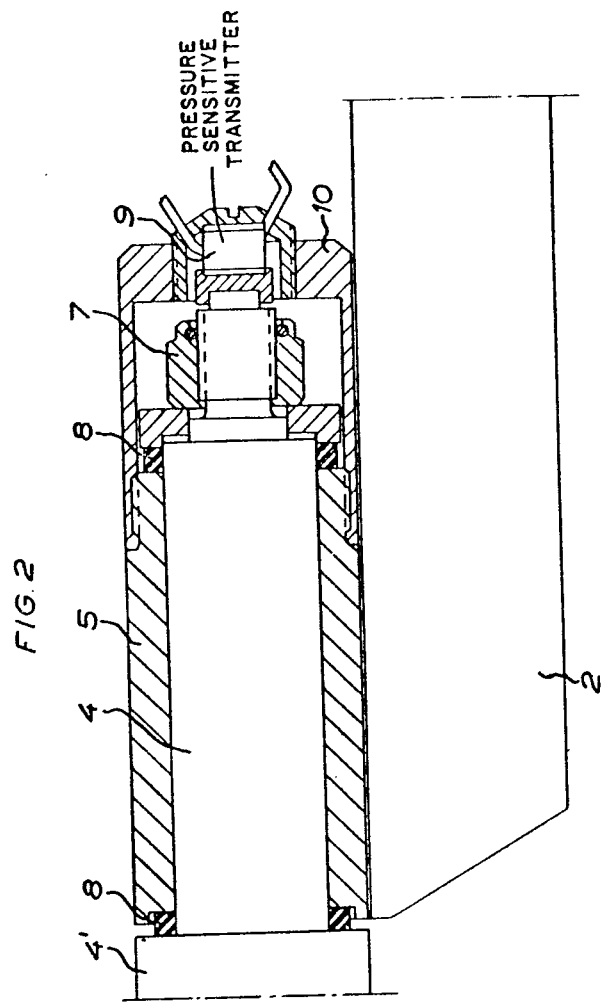
FIG. 2 is a sectional view on a larger scale of the operating system and part of the coupling unit of the trailer having a variation in construction from FIG. 1 but similar parts.

In FIGS. 1 and 2 of the drawings, 1 designates a tractor vehicle and 2 a trailer vehicle. The coupling unit 3 of the tractor 1 includes a ball engaging a ball socket formed at the forward end of a draw bar 4. The draw bar 4 extends through a sleeve 5 secured to the frame of the trailer 2. The portion of the draw bar extending within the sleeve 5 is somewhat narrower than the portion of said bar carrying the ball socket whereby an abutment 4' is formed immediately adjacent the forward end of the sleeve 5. Provided at the rear end of the draw bar are a washer 6 and a nut 7. This washer forms another abutment. Interposed between the sleeve ends and, on one side, the abutment 4' and, on the other side, the washer 6 are elastic spacing rings 8 which permit a certain displacement of the draw bar relative to the sleeve 5 when the relative speeds of the tractor and trailer vehicles change. The spacing rings tend to hold the draw bar in a middle or neutral position relative to the sleeve. A pressure sensitive transmitter 9 is provided between the rear end of the draw bar 4 and an abutment 10 which is fixed relative to said sleeve 5. The transmitter 9 is connected to a suitable amplifier 11 which controls the supply of power actuating the brakes 12 of the trailer. As mentioned above, the brakes 12 according to the embodiment shown are electrically operable and the operating current supplied from the tractor 1 via the contact 13 and the line 14 is regulated by the amplifier 11 which is controlled by the transmitter. To obtain perfect control over the effect of the brakes and to avoid jerks in the coupling unit resulting in braking, the amplifier in the example shown is made operative through the brake light contact 15 of the tractor vehicle. This involves the advantage that the tractor-trailer unit can be backed without any braking taking place in the trailer. The amplifier is preferably adapted to supply a certain voltage to the brakes 12 on closure of the brake light circuit on line 16 so as to obtain initial braking. As the brake light normally is switched on even at such a low pressure in the braking system of the tractor vehicle that the brakes have not yet begun to operate, this arrangement involves that the trailer can be braked separately. When the braking pressure of the tractor has increased so much that the tractor begins to slow down, the draw bar 4 wll be displaced rearwardly in the sleeve 5 and actuate the transmitter 9 which in turn actuates the amplifier to increase the operating current of the brakes and thus obtain the intended braking power. When the braking of the tractor ceases, the current in the brake light circuit is broken, whereby the trailer brake is made inoperative.

Figure 3:
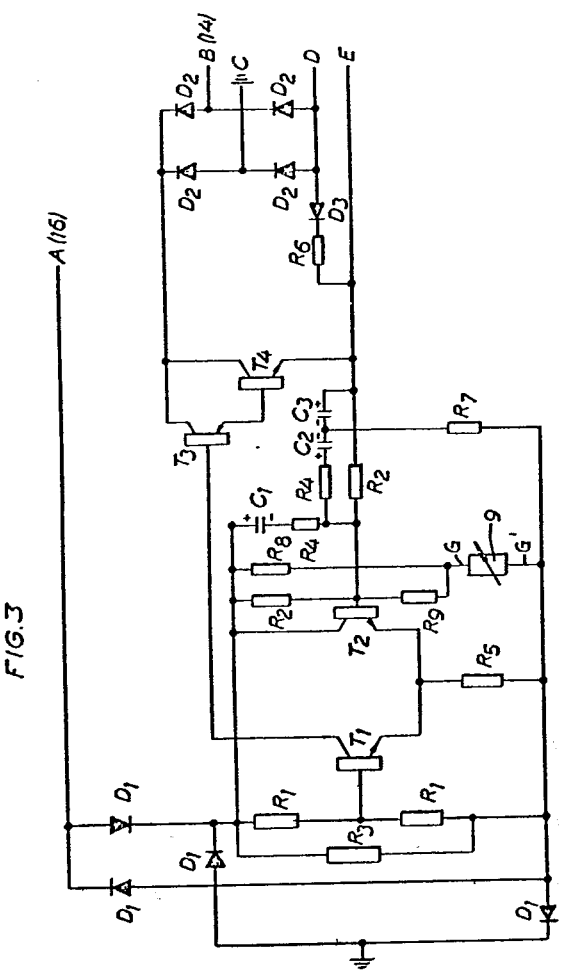
FIG. 3 shows an electric wiring diagram.

FIG. 3 is a wiring diagram illustrating an embodiment of the amplifier 11 were (as also shown in FIG. 1) A is connected to the line 16 in the brake light circuit of the tractor, B is connected to the line 14, C is connected to the chassis, and D and E are connected to the electrically operated brakes 12 of the trailer. G and G' are connected to pressure sensitive transmitter 9 shown here as a variable resistance. The diodes $D_1$ and $D_2$, each a group of four diodes connected in a bridge network, makes the amplifier independent of the battery polarity of the tractor (i.e. irrespective of whether the plus or minus pole is earthed). The input of the amplifier includes two transistors $T_1$ and $T_2$ in differential connection. The transistor $T_3$ is complementarily connected to the end transistor $T_4$. This permits the electric brake to be controlled by almost the entire battery voltage. The amplifier is push-pull coupled by means of the resistors $R_2$. The RC circuit $R_4$, $C_2$, $C_3$ prevents oscillations between the tractor and trailer. The other components are well known to anyone skilled in the art and would therefore not seem to require any specification.

Of course the transmitter can also be adapted to be actuated when the coupling unit is subjected to a pull exceeding a certain value and in that case the amplifier is adapted to supply to the trailer brakes a maximum or relatively high voltage when it is actuated by the closure of the brake light circuit. The fact that the wheels of the trailer will thus be momentarily braked more heavily than the wheels of the tractor will produce a pull in the coupling unit making the amplifier reduce the brake current to a value resulting in an equally heavy braking of both the vehicles, i.e. so that the pull in the coupling unit returns to normal value.

It is obvious that the operating system of this invention also is applicable to hydraulic or pneumatic braking systems. For this purpose the amplifier 11 is adapted to control the pressure medium supply to the brakes via electrically operable valve members, and also here the brake light circuit can be adapted to control the initial braking as well as the interruption of the braking provided a suitable pressure medium source is arranged.

For example, in the functioning of the system when the brake pedal of the towing vehicle is pressed down and the pressure of the brake system reaches a value of 5-6 kp/cm$^2$ (71-85 pound/sq.inch) the stop light switch will close and this circuit activates the control system of the trailer. As the brakes of the towing vehicle do not give any braking effect on such low pressure, the brakes of the trailer will function before the brakes of the towing vehicle. If the control system is set on a given initial braking effect, a light braking of the trailer will occur and this results in a pull between the towing and trailing vehicles which in turn results in a decrease of the voltage of the braking current until a position of equilibrium is reached. Accordingly there is a possibility of separately braking of the trailer over the brake pedal of the towing vehicle. On normal braking — when the pedal is pressed down so that the wheels of the towing vehicle are braked — a pressure force acts against the draw bar, and this force biases the control system which immediately gives the desired voltage directly proportional to the braking of the towing vehicle so that a synchronized braking of the two vehicles occur.

According to the example shown the transmitter may consist of elastic rubber material which changes its resistance when compressed, or a compressible container with carbon powder or the like acting in a similar manner. The transmitter may also consist of a coil including a relatively displaceable core if it is desired to make use of frequency changes for controlling the amplifier, or a capacitor the relatively displaceable parts of which cause a change of the capacitance.

Instead of a transmitter arranged as shown in the drawings, it is possible in case of a substantially rigid draw bar to arrange electrical means which with the aid of specific amplifier means may sense the load which the draw bar is subjected to.

The fact that the override force actuating the transmitter in the operating system of this invention is dependent on the mass of the trailer will permit the operating system to regulate the braking power supply so that an appropriate braking power is produced irrespective of whether the trailer is loaded or not. The system further is self-regulating because, if the braking power at a certain moment should be too great, the transmitter, which tends to take a position corresponding to a minimum of braking power, will control the amplifier so as to reduce the power supply to the brakes. As the impulses for increased and reduced braking power follow each other at very small time intervals, the changes in braking power will follow a relatively uniform curve and take place without any noticeable jerks due to the inertia of the braking system. The fact that the operating system of this invention includes no mechanical details which would have to be moved long distances for the regulation of the braking power involves that the risk of oscillatory movements and jerks between the tractor and trailer vehicles is entirely eliminated.

The invention is not limited to the embodiments described herein and shown in the drawings but can be modified within the scope of the appended claims.

What we claim and desire to secure by Letters Patent is:

1. Operating system for trailer brakes adapted to regulate the effect of the brakes of the trailer vehicle in dependence on changes in load occurring on the coupling unit between tractor and trailor vehicles as a result of differences in relative speed between said vehicles comprising:
    tractor and trailer coupling means connected to each other forming a substantially rigid coupling unit,
    transmitter means sensing pressure and pull connected in said coupling unit activated by even small changes in relative positions of said coupling means,
    amplifier means responsive to pressure and pull on said transmitter means including
    a pair of input differentially connected transistors,
    a pair of complementarily connected transistors connected to said first-mentioned pair of transistors,
    diode bridge networks connected preceding the input of said first-mentioned transistors and following the output of said second-mentioned transistors,
    and damper means to prevent oscillations in the tractor-trailer unit;
    power source to the brakes connected to and controller by said amplifier means,
    and brake light circuit means connected in such system of above-mentioned means to operate said system when said circuit means is closed.

2. Operating system for trailer brakes adapted to regulate the effect of the brakes of the trailer vehicle in dependence on changes in load occurring on the coupling unit between tractor and trailer vehicles as a result of differences in relative speed between said vehicles comprising:
    tractor and trailer coupling means connected to each other forming a substantially rigid coupling unit,
    transmitter means sensing pressure and pull connected in said coupling unit activated by even small changes in relative positions of said coupling means,
    amplifier means responsive to pressure and pull on said transmitter means including
    damper means to prevent oscillations in the tractor-trailer unit comprising a resistance-capacitor circuit,
    power source to the brakes connected to and controlled by said amplifier means,
    and brake light circuit means connected in such system of above-mentioned means to operate said 3. Operating system for trailer brakes adapted to regulate the effect of the brakes of the trailer vehicle in dependence on changes in load occurring on the coupling unit between tractor and trailer vehicles as a result of differences in relative speed between said vehicles comprising:
  tractor and trailer coupling means connected to each other forming a substantially rigid coupling unit,
  transmitter means sensing pressure and pull connected in said coupling unit activated by even small changes in relative positions of said coupling means,
  amplifier means responsive to pressure and pull on said transmitter means including
  power source to the brakes connected to and controlled by said amplifier means,
  brake light circuit means connected in such system of above-mentioned means to operate said system when said circuit means is closed,
  said amplifier means applying initial braking power to the brakes irrespective of sensing by said transmitter means.

4. A method of controlling the operation of trailer brakes to regulate the effect of the brakes of the trailer vehicle in dependence on changes in load occurring on the coupling unit between tractor and trailer vehicles as a result of differences in relative speed between said vehicles which comprises:
  moving the tractor and trailer coupling means in its pressure and pull directions relative to each other proportional to forces acting on said coupling means during changes in relative speed,
  sensing changes proportional to the magnitude and direction of the pressure and pull on the coupling means allowed by the elasticity of the coupling means,
  amplifying the changes sensed,
  applying initial braking power to the brakes irrespective of the changes sensed,
  controlling the power to the brakes in accordance with the changes sensed,
  and closing a brake light circuit means to initiate the performance of the above-mentioned steps.

5. Operating system for trailer brakes adapted to regulate the effect of the brakes of the trailer vehicle in dependence on changes in load occurring on the coupling unit between tractor and trailer vehicles as a result of differences in relative speed between said vehicles comprising:
  tractor and trailer coupling means connected to each other forming a substantially rigid coupling unit,
  transmitter means sensing pressure and pull connected in said coupling unit activated by even small changes in relative positions of said coupling means,
  amplifier means responsive to pressure and pull on said transmitter means including
  a pair of input differentially connected transistors,
  a pair of complementarily connected transistors connected to said first-mentioned pair of transistors,
  and damper means to prevent oscillations in the tractor-trailer unit,
  power source to the brakes connected to and controlled by said amplifier means,
  and brake light circuit means connected in such system of above-mentioned means to operate said system.

6. Operating system for trailer brakes adapted to regulate the effect of the brakes of the trailer vehicle in dependence on changes in load occurring on the coupling unit between tractor and trailer vehicles as a result of differences in relative speed between said vehicles comprising:
  tractor and trailer coupling means connected to each other forming a substantially rigid coupling unit,
  transmitter means sensing pressure and pull connected in said coupling unit activated by even small changes in relative positions of said coupling means,
  amplifier means responsive to pressure and pull on said transmitter means including
  damper means to prevent oscillations in the tractor-trailer unit,
  power source to the brakes connected to and controlled by said amplifier means,
  and brake light circuit means connected in such system of above-mentioned means to operate said system when said cirucit means is closed.

7. The operating system according to claim 6, further characterized by:
  said damper means including an electrical circuit means.

* * * * *